(12) United States Patent
Kleihorst (10) Patent No.: US 8,593,524 B2
(45) Date of Patent: Nov. 26, 2013

(54) CALIBRATING A CAMERA SYSTEM (75) Inventor: Richard Petrus Kleihorst, Kasterlee (BE)

(73) Assignee: Koninklijke Philips N.V., Eindhoven (NL)

( * ) Notice: Subject to any disclaimer, the term of this patent is extended or adjusted under 35 U.S.C. 154(b) by 789 days.

(21) Appl. No.: 12/518,650

(22) PCT Filed: Dec. 14, 2007

(86) PCT No.: PCT/IB2007/055101
§ 371 (c)(1),
(2), (4) Date: Jun. 11, 2009

(87) PCT Pub. No.: WO2008/075271
PCT Pub. Date: Jun. 26, 2008

(65) Prior Publication Data
US 2010/0020178 A1    Jan. 28, 2010

(30) Foreign Application Priority Data
Dec. 18, 2006 (EP) .................................... 06126322

(51) Int. Cl.
*H04N 17/00* (2006.01)
*H04N 17/02* (2006.01)
*H04N 13/00* (2006.01)
*H04N 9/04* (2006.01)
*H04N 5/225* (2006.01)
*H04N 9/09* (2006.01)
*H04N 9/097* (2006.01)
*G06K 9/00* (2006.01)

(52) U.S. Cl.
USPC ........ 348/175; 348/42; 348/207.99; 348/262; 382/154

(58) Field of Classification Search
USPC .......................................................... 382/154
See application file for complete search history.

(56) References Cited

U.S. PATENT DOCUMENTS

2004/0096082 A1 * 5/2004 Nakai et al. ................... 382/104

OTHER PUBLICATIONS

Thao Dang et al; "Tracking Camera Parameters of an Active Stereo Rig", Pattern Recognition, vol. 4174, Sep. 21, 2006, pp. 627-636, XP002518812.

(Continued)

*Primary Examiner* — Jeffrey Harold
*Assistant Examiner* — Michael Teitelbaum (57) ABSTRACT

A method of calibrating a camera system which is capable of recording at least two images simultaneously is described. The method comprises the step of processing a first pair of images, wherein the processing step comprises transforming at least one of a first and a second image of the first pair through a projective map on a plane, the map depending on one or more parameter values, so as to align an epipolar line in the first image with a corresponding epipolar line in the second image of the first pair, resulting in a second pair of images. The method further comprises estimating respective values for a disparity, which values associate respective first pixels along a first epipolar line in a first image of the second pair with respective second pixels along a corresponding second epipolar line in a second image of the second pair, and displacing respective pixels of the first epipolar line in the first image of the second image pair in accordance with a respective value of the disparity for the respective pixels. The method further comprises determining a measure of error between the first and the second image of the second image pair, dependent on the one or more parameters, determining an update for the one or more parameter values for reducing a value of the measure of error, and updating the one or more parameter values, using the update.

11 Claims, 7 Drawing Sheets

(56) References Cited

OTHER PUBLICATIONS

O.D. Faugeras et al; "Camera Self-Calibration: Theory and Experiments", Proc. Second European Conf. Computer Vision, pp. 321-334, May 1992.

Lutz Falkenhagen: Depth Estimation From Stereoscopic Image Pairs Assuming Piecewise Continuos Surfaces, Proc. of European Workshop on Combined Real and Synthetic Image Processing for Broadcast and Video Production, Hamburg, Nov. 1994.

J. Crawley T al; "Maintaining Stereo Claibration by Tracking Image Points", CVPR, New York, NY, June 1993.

N. Thacker et al: "Online Stereo Camera Calibration", Tina Memo, No. 1992-002, June 9, 2005.

K. Levenberg; "A Method for the Solution of Certain Problems in Least Squares", Quart. Appl. Math. vol. 2, pp. 164-168.

P. E. Gill et al; "Algorithms for the Solution of the Nonlinear Least-Squares Problem", Siam J. Numer. Anal. vol. 15, No. 5, pp. 077-992, 1978.

\* cited by examiner

(410) $G(x,y,m) = (m_2 x + m_3 y + m_4)/(m_5 x + m_6 y + m_7)$ (412) $E(m) = \Sigma \{ A_{left}(x,y) - A_{right}((x+ d[x,y]), y)\}^2$

(602) $SAD(x, y; d) = \sum_{i,j=-1}^{i,j=1} \| left(x+i, y+j) - right(x+i+d, y+j) \|$

CALIBRATING A CAMERA SYSTEM

FIELD OF THE INVENTION

The invention relates to a method of calibrating a camera system, a camera system with calibrating means, calibrating means for use in a camera system and software for implementing the method.

BACKGROUND OF THE INVENTION

Computer vision systems often comprise stereo camera systems for capturing stereo images that are subsequently processed in a digital way. Such camera systems are to be calibrated so that the image data is the correct input for further processing. The purpose of camera calibration is to determine the transformation from the three-dimensional (3D) world coordinates to the two-dimensional (2D) image coordinates. Once this transformation is known, 3D information about the real world can be obtained from the 2D information in the image or images.

In "Camera Self-Calibration: Theory and Experiments", *Proc. Second European Conf. Computer Vision*, pp. 321-334, May 1992, O. Faugeras, T. Luong and S. Maybank describe a calibration method that requires only point matches from image sequences. The authors state that it is possible to calibrate a camera just by pointing it at the environment, selecting points of interest and then tracking them in the image as the camera moves. It is not necessary to know the movement of the camera. Their camera calibration is computed in two steps. In the first step, the epipolar transformation is found. In the second step, the epipolar transformation is linked to the image of the absolute cone, using the Kruppa equations.

In "Maintaining Stereo Calibration by Tracking Image Points", 1993 *CVPR, New York, June* 1993, J. Crawley, P. Bobet and C. Schmid address the problem in active 3D vision of updating the camera calibration matrix as the focus, aperture, zoom or vergence angle of the cameras changes dynamically. The authors present a technique of computing the projection matrix from five and a half points in a scene without matrix inversion. They then present a technique of correcting the projective transformation matrix by tracking reference points. The experiments show that a change of focus can be corrected by an affine transform obtained by tracking three points. For a change in camera vergence, a projective correction based on tracking four image points is slightly more precise than an affine correction matrix. They also show how stereo reconstruction makes it possible to "hop" a reference frame from one object to another. Any set of four non-coplanar points in the scene may define such a reference frame. They show how to keep the reference frame locked onto a set of four points as a stereo head is translated or rotated. These techniques make it possible to reconstruct the shape of an object in its intrinsic coordinates without having to match new observations to a partially reconstructed description.

In "Online Stereo Camera Calibration", *Tina Memo No.* 1992-002, *updated Jun.* 9, 2005, N. Thacker and P. Courtney argue that successful implementation of stereo vision in a real-world application will require a self-tuning system. They describe a statistical framework for the combination of many sources of information for calibrating a stereo camera system, which results in a calibration system that would allow continual recalibration during normal use of the cameras. The authors demonstrate this with the use of measured 3D objects, accurate robot motion and matched stereo features in a working vision system. More specifically, Thacker et al. calibrate a stereo camera system through an iterative estimation procedure for the transformation and the camera parameters using feature points for equivalence matching.

SUMMARY OF THE INVENTION

The systems in the Faugeras and Crawley publications referred to above rely on tracking moving reference objects for their camera calibration. The system in the Thacker publication uses an approach wherein the parameters are approximated in an iterative process using feature points.

The inventor proposes an alternative approach that does not require the selection of suitable reference points. The invention provides a method of calibrating a camera system without solving the projection parameters in a direct way. The method comprises the step of processing a first pair of images. The processing step comprises transforming at least one of a first and a second image of the first pair through a projective map, or projective mapping, on a plane. The map depends on one or more parameter values, so as to align an epipolar line in the first image with a corresponding epipolar line in the second image of the first pair, resulting in a second pair of images. Respective values are then estimated for a disparity, which values associate respective first pixels along a first epipolar line in a first image of the second pair with respective second pixels along a corresponding second epipolar line in a second image of the second pair. The disparity is indicative of the depth. Subsequently, respective pixels of the first epipolar line in the first image of the second image pair are displaced in accordance with a respective value of the disparity for the respective pixels. Then, a measure of error is determined between the first and the second image of the second image pair. The error measure depends on the one or more parameter values. Next, an update is determined for the one or more parameter values in order to reduce a value of the measure of error, and the one or more parameter values are updated, using the update so determined.

In the invention, the quality of the fit for the depth estimation result on the displacement is used as an update criterion for the camera calibration parameters. The operation is thus executed in an efficient way, using the depth estimation. The present invention thus provides a method of calibrating a camera system without solving the projection parameters in a direct way and does so in a manner that does not require the selection of suitable reference points.

In accordance with a first embodiment of the invention, the transforming step comprises rectifying a single one of the first and the second image of the first pair through a projective map on a plane of the other one of the first and the second image of the first pair. In this manner, the camera can be calibrated and, moreover, only a single image of the first pair needs to be rectified, thereby reducing the amount of processing.

In accordance with a second embodiment of the invention, the transforming step comprises rectifying both the first and the second image of the first pair through an individual projective map on one and the same plane so as to horizontally align the respective epipolar lines in the images of the second pair. Although rectifying both images requires additional processing, the horizontal placement of the epipolar lines in both images facilitates further processing.

A method according to the present invention preferably comprises the step of subjecting a subsequent pair of images to the processing operation so as to calibrate the camera system in an ongoing iterative process in operational use of the camera system.

Embodiments of the invention relate to a camera system comprising calibrating means for calibrating the camera system, calibrating means for use in such a system, and software for implementing the method of the invention, all as defined in the appended claims.

BRIEF DESCRIPTION OF THE DRAWINGS

The invention will be explained in further detail, by way of example and with reference to the accompanying drawings, wherein.

Throughout the Figures, similar or corresponding features are indicated by the same reference numerals.

DESCRIPTION OF EMBODIMENTS

In computer vision, depth estimation can be obtained through stereo imaging, using multiple cameras. Disparities between respective images of a stereo pair taken from the same object at different angles can then be used for measuring distances or depths. The human vision system uses disparities as a binocular cue to determine depth by using disparities as viewed by the left and right eye. In machine vision, similar techniques are used in fields of application such as robot navigation and image analysis.

There are several methods of extracting three-dimensional structure from a pair of two-dimensional images. In a first method, referred to as the calibrated method, the cameras need to be calibrated with respect to some world coordinate system. Then, the epipolar geometry (see under FIGS. 2 and 3 below) is calculated by extracting the "essential" matrix of the system. This allows computation of the three-dimensional Euclidean structure of the imaged scene. Afterwards, disparity can be estimated by searching for equivalents on the epipolar lines only. A second method, referred to as the uncalibrated method, corresponds to the way in which biological systems determine three-dimensional structure from vision. In an uncalibrated system, a quantity known as the fundamental matrix is calculated from image correspondences, and this is then used to determine the projective three-dimensional structure of the imaged scene. The invention relates to the calibrated method.

Typically, disparity estimation is based on the information available on the epipolar lines in order to create detailed depth maps. The concept "epipolar line" will be described in more detail with reference to FIGS. 2 and 3. To ensure that the epipolar-line approach works properly, the cameras have to be properly aligned (i.e. calibrated) so as to have the respective rows of pixels of the respective images coincide with the epipolar lines of the respective cameras.

Mechanical camera calibration is a cumbersome process which typically requires manual intervention by an operator, sometimes even continuously or periodically if the cameras get subjected to tremors or shocks in operational use.

The term "calibration" as used in the present invention refers to the process of calculating the intrinsic parameters of the camera system by using only the information available in the images taken by this camera system. No calibration frame or known object is needed for a stereo camera system, as both images reflect a scene at the same moment in time. The geometric information that associates two different viewpoints of the same scene with each other is entirely contained in a mathematical construct known as the essential matrix. The two viewpoints may be a stereo pair of images, or a temporal pair of images. In the latter case, the two images are taken at different times, with the camera moving between image acquisitions. The geometry of two different images of the same scene, known as the epipolar geometry, is considered first with reference to FIGS. 2 and 3. It is based on triangulation.

Figure 1:
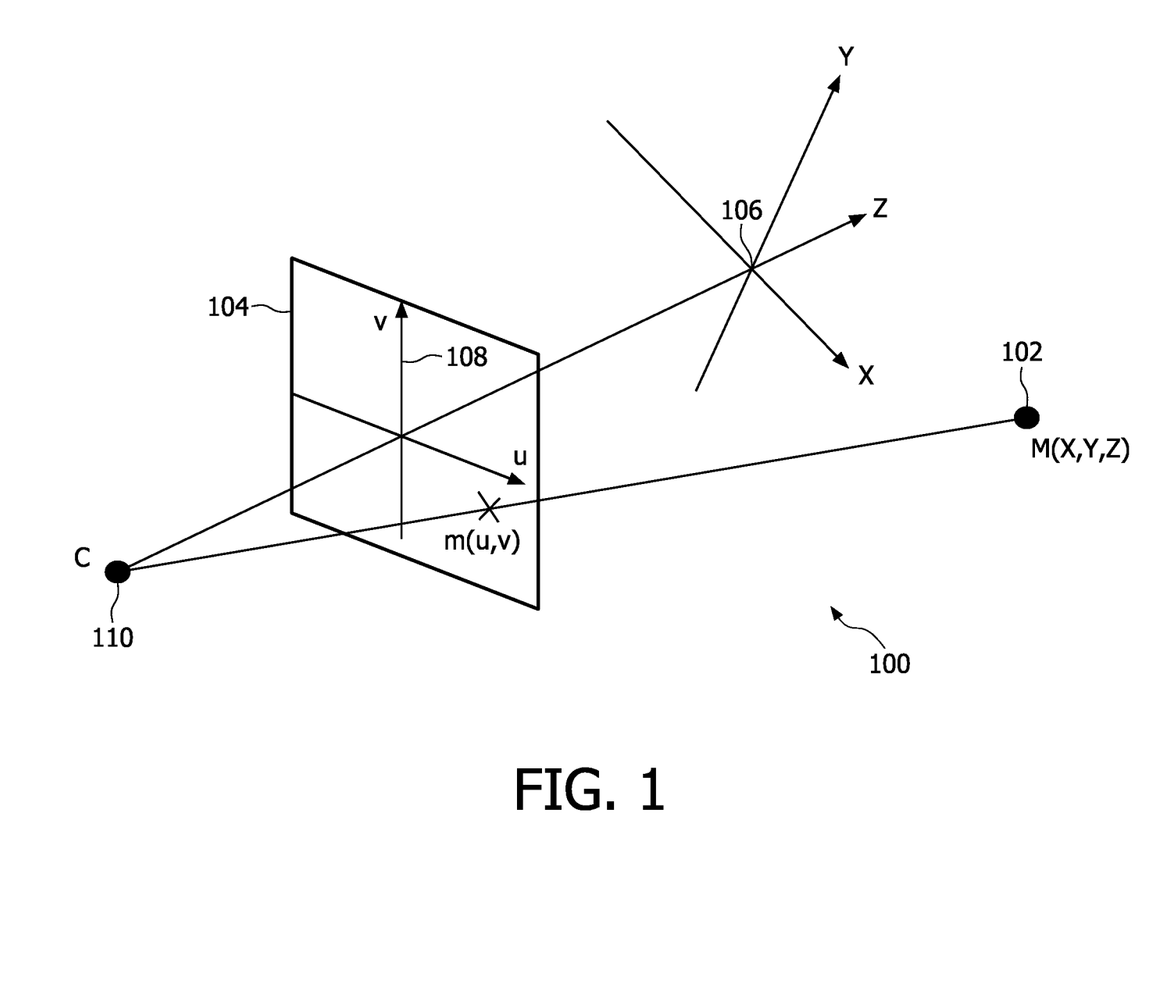
FIG. 1 is a diagram illustrating the creation of a 2D image from an object in a 3D world.

FIG. 1 is a diagram illustrating the creation of a 2D image of an object in a 3D world. An image of an object 102 in the 3D world is captured by a camera in a 2D image 104. The position of object 102 in 3D coordinates is given as M(X,Y,Z), wherein X, Y and Z are the values of the Cartesian coordinates of the position with respect to some reference coordinate system 106. Image 104 comprises an image of object 102 at location m(u,v), wherein u and v are the values of the Cartesian coordinates of the position of the image of object 102 relative to a coordinate system 108. For convenience, coordinate system 108 has its origin at the intersection of the optical axis and the plane of image 104. Position m(u,v) in image 104 is determined by the projection of object 102 on the plane of image 104 in the direction of a center of projection 110.

Figure 2:
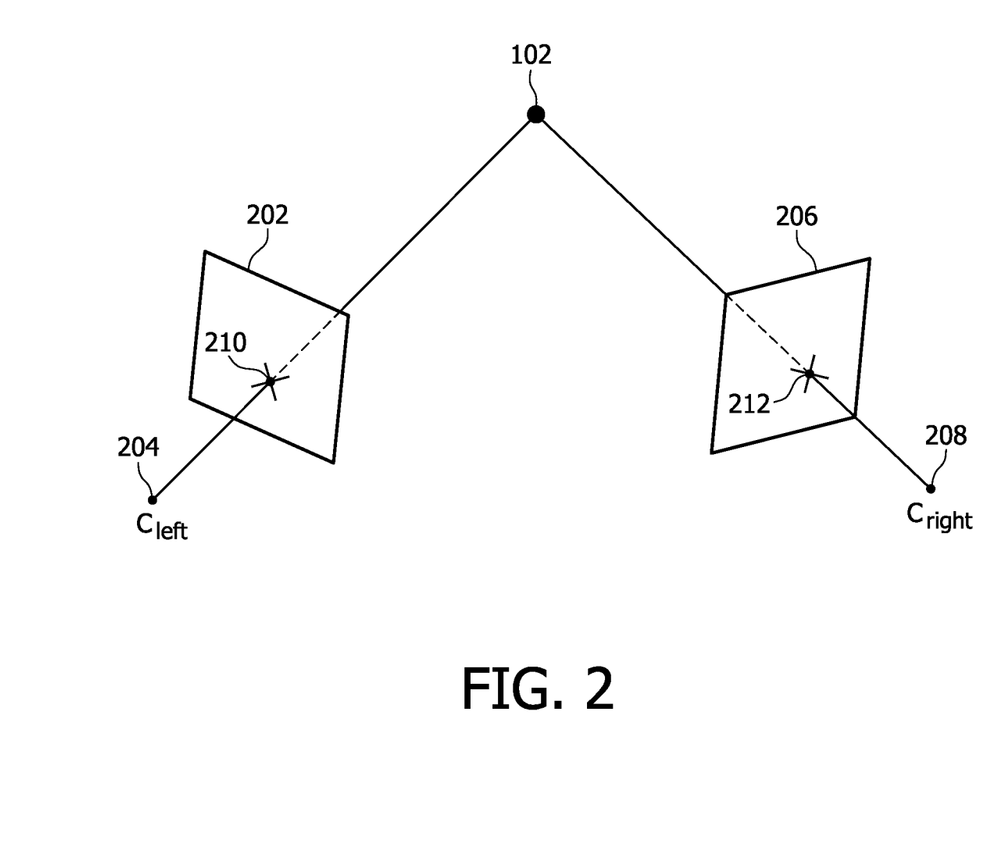
FIG. 2 is a diagram illustrating the creation of two 2D images of the object from different positions and with different orientations.

FIG. 2 is a diagram illustrating the creation of two 2D images of object 102, taken from different positions and with different orientations. Object 102 is now captured by a camera on the left and a camera on the right, giving rise to an image 202 on the left determined by a center of projection 204, and an image 206 on the right determined by a center of projection 208. Determination of the 3D position of object 102 through triangulation depends on matching the image location 210 of object 102 in image 202 to location 212 of object 102 in image 206.

Figure 3:
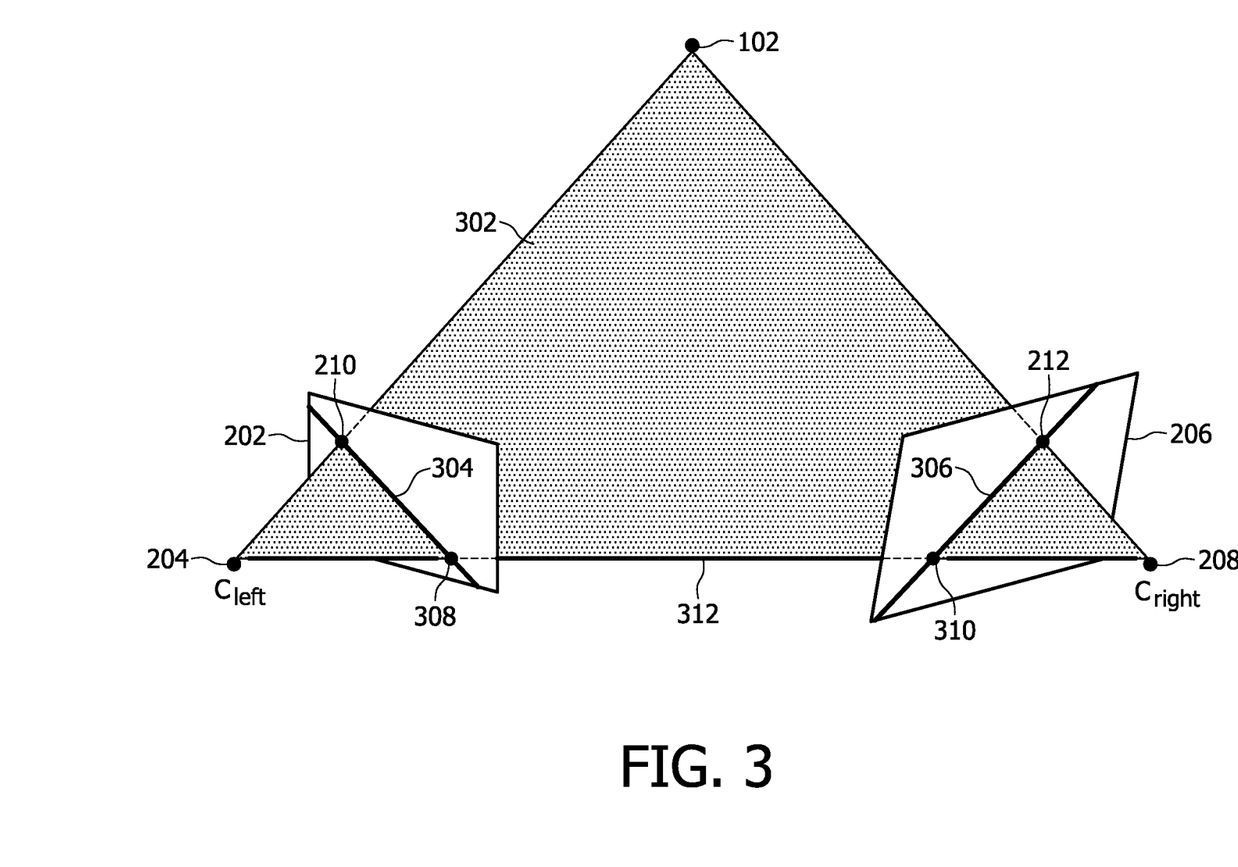
FIG. 3 is a diagram illustrating the geometrical configuration for matching image locations in different images.

FIG. 3 is a diagram illustrating the geometrical configuration for matching image locations 210 and 212 to each other. Object 102 and centers of projection 204 and 208 determine a plane 302 in the 3D world. Plane 302 has an intersection 304 with image 202 determined by image location 210 and centers 204 and 208. Intersection 304 is a line segment. Likewise, plane 302 also has an intersection 306 with image 206 determined by image location 210 and centers 204 and 208. Locations 308 and 310, where line segments 304 and 306 intersect with a baseline 312 connecting centers 204 and 208, are referred to as the "epipoles". Line segments 304 and 306 are referred to as the "epipolar lines". Epipole 308 can be regarded as the image, in the left-hand camera, of center 208. Likewise, epipole 310 can be regarded as the image in the right-hand camera of center 204. Plane 302 is referred to as the "epipolar plane".

Accordingly, once one has the information about one of image locations 210 and 212, say location 210, and information about epipoles 308 and 310, then plane 302 is known and therefore epipolar lines 304 and 306. As a result, one knows that the other image location, location 212 is to be found on epipolar line 306.

According to the present invention, the stereo matching problem, the problem of matching the locations in stereo images, can be solved much more efficiently if images are first subjected to a step referred to as rectification. This step consists of transforming the images so that the epipolar lines are aligned with one another, preferably horizontally. The planes of the images are then mapped on a further plane that comprises the line between the centers of projection. With reference to FIG. 3, the planes of images 202 and 206 are mapped on a plane that comprises baseline 312. In this case, stereo matching algorithms can take advantage of the epipolar constraint and reduce the search space to one dimension (i.e. corresponding rows of the rectified images). The epipolar constraint thus reduces the matching problem to a one-dimensional search along conjugate epipolar lines. The search is preferably not carried out by comparing a single pixel on the epipolar line of one image with a single pixel on the epipolar line of the other image. Instead, windows of pixels along the epipolar lines are compared to find the best match.

In the invention, the rectification step is carried out by mapping image 206 directly on the plane of image 202 as the system in the invention uses stereoscopic vision through cameras whose optical axes are approximately parallel. The invention calibrates the system by adjusting one of the camera images so that the epipolar lines in both images coincide. Optionally, both camera images are adjusted so that the epipolar lines correspond to horizontal rows of pixels in both images.

Figure 4:
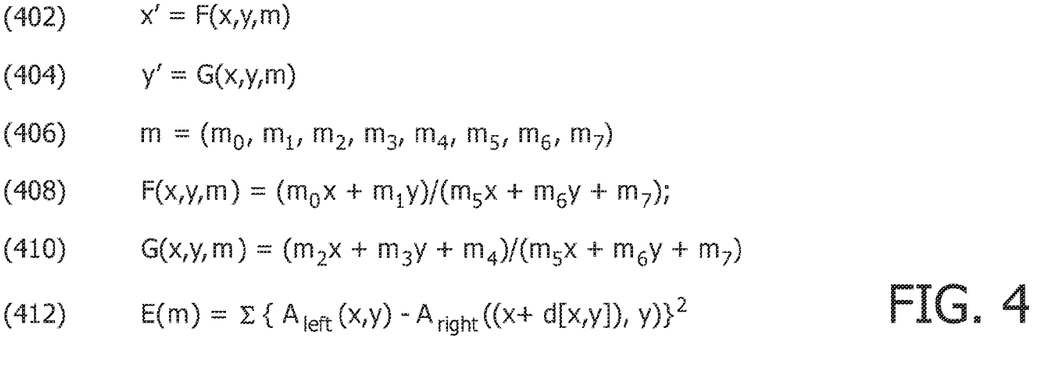
FIG. 4 gives formulae to explain the process in the invention.

Referring to FIG. 4, equations (402)-(410) specify the transformation that expresses the coordinates x' and y' in the plane of image 206 in the coordinates x and y of the plane of image 202. The values in the array for the quantity m in expression (406) are representative of the camera's calibration parameters. Within the expression for G(x,y,m), a vertical shift is introduced by the parameter $m_4$, while a horizontal shift is omitted from the expression for F(x,y,m) as the disparity is to be taken into account as a separate entity.

A measure for the error between image 202 and rectified image 206 can now be created, dependent on an estimated disparity map and the calibration parameters. The estimated disparity map comprises estimated disparity values d(x,y) for respective pixels (x,y). The disparity estimation process will be described hereinafter. Minimizing this error with respect to the calibration parameters of expression (406) gives the calibration values sought for.

An example of an error measure E(m) is given in expression (412). This error measure E(m) is the sum of squares of specific terms. Each specific term is the difference between the pixels in a specific window $A_{left}$ at coordinates x, y on the epipolar line of left image 202 and the pixels in a specific window $A_{right}$ at coordinates (x',y) displaced in the x-direction over the value of the estimated disparity d(x,y) in the right image 206. Note that the y-coordinate is the same for the left window $A_{left}$ and the right window $A_{right}$ due to the alignment of the epipolar lines with the horizontal. The total sum E(m) is formed by summing the squared minimum differences over all windows. The term "minimum" will be explained further below. The sum E(m) is then used as a criterion to update the projection parameters.

There are several ways of finding a solution to the problem of minimizing a sum of squares by using numerical methods. The Levenberg-Marquardt algorithm provides a numerical solution to the mathematical problem of minimizing a sum of squares of several, generally nonlinear functions that depend on a common set of parameters. This minimization problem arises especially in least-square curve fitting. The Levenberg-Marquardt algorithm (LMA) interpolates between the Gauss-Newton algorithm (GNA) and the method of gradient descent. On the one hand, the LMA is more robust than the GNA, which means that in many cases it finds a solution even if it starts very far off the final minimum. On the other hand, for well-behaved functions and reasonable starting parameters, the LMA tends to be a bit slower than the GNA. The LMA is one of the most popular curve-fitting algorithms; for more information see "A Method for the Solution of Certain Problems in Least Squares." by Levenberg, K. published in Quart. Appl. Math. 2, 164-168, 1944 or "Algorithms for the solution of the nonlinear least-squares problem" by Gill, P. E. and Murray, W. published in SIAM J. Numer. Anal. 15 [5] 977-992, 1978, both articles herein incorporated by reference.

Figure 5:
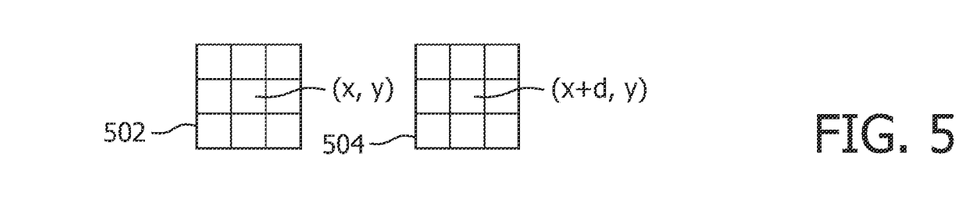
FIGS. 5 and 6 are diagrams and a formula explaining the disparity estimation.
Figure 6:
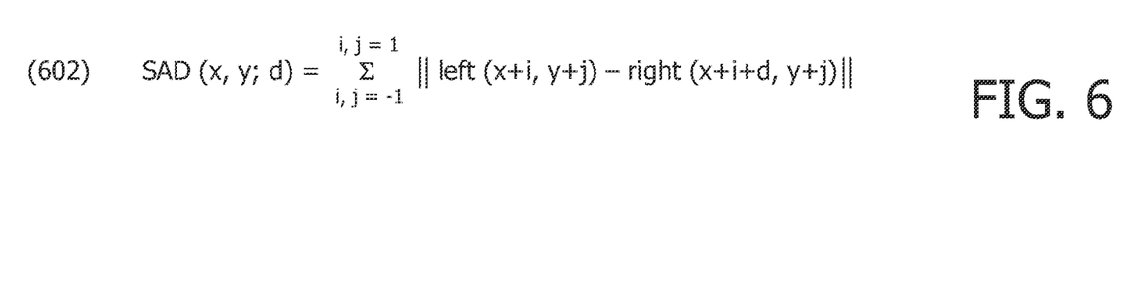

An example of a process for estimating the disparity for individual pixels (x,y) is described with reference to FIGS. 5 and 6. First, consider a window 502 of, say, 3×3 pixels in left image 202 and a similar window 504 in right image 206. Window 502 is centered around pixel coordinates (x,y), and window 504 is centered around pixel coordinates (x+d, y) wherein the expression x+d evaluates to a value between 0 and N, N being the width of the image. The pixel values of window 502 are compared with the pixel values of window 504, e.g. according to formula 602 in FIG. 6. Basically, formula 602 gives the sum of the absolute differences (SAD) at coordinates (x,y) for a particular disparity value d. The next step is to determine the value d for which expression 602 is smallest, which value d can be used as an estimate of the disparity d(x,y) for pixel (x,y). The minimum value of SAD (x,y;d) is indicated by $SAD_{min}$ (x,y).

Summing the values of $SAD_{min}$ (x,y) for all respective pixels in turn yields the error measure E(m) as represented by the expression of formula (412).

Figure 7:
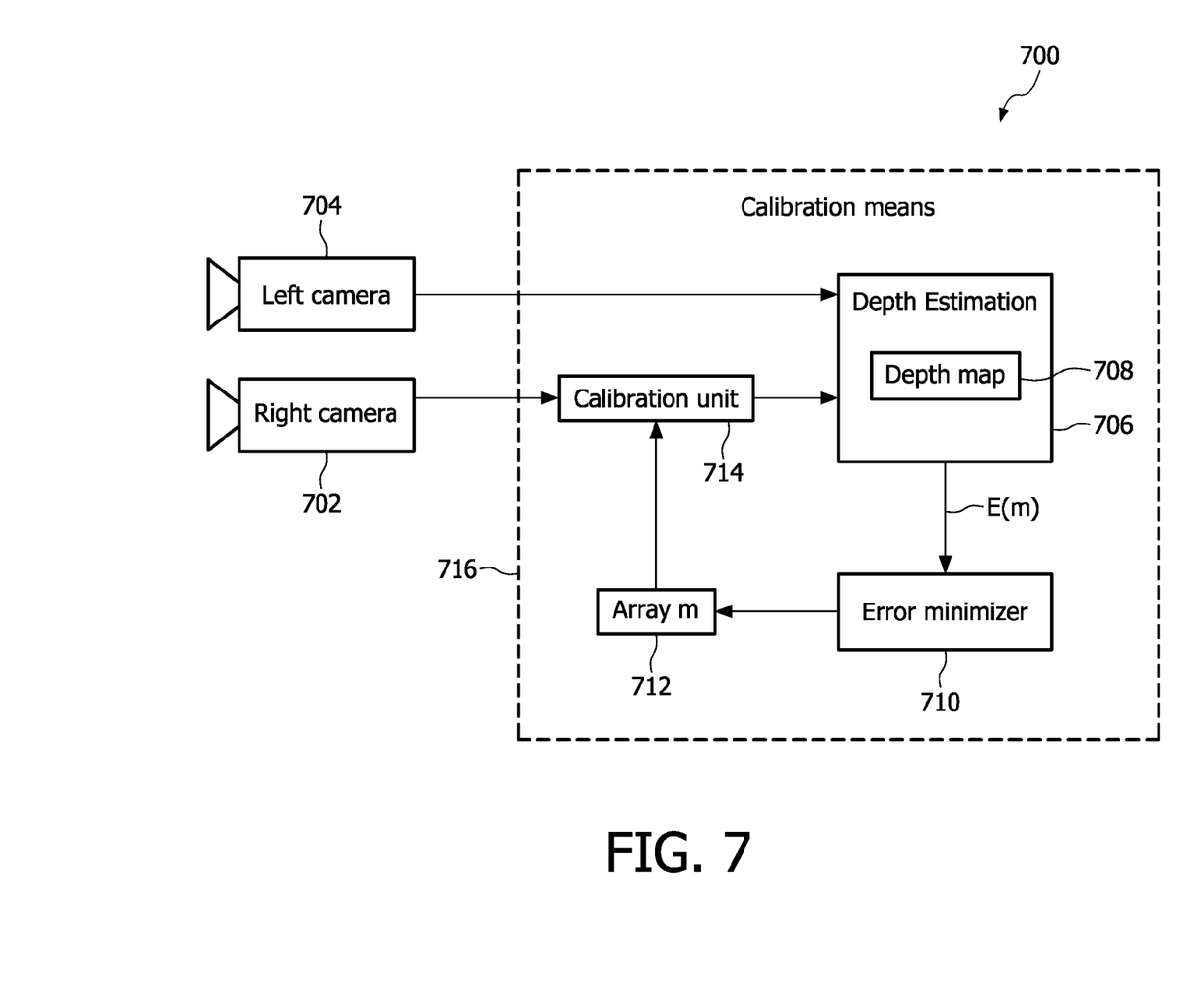
FIG. 7 is a diagram of a system in accordance with the first embodiment of the invention.

Now, the procedure illustrated in FIG. 4 can be executed on-the-fly by using the configuration of a system 700 as illustrated in FIG. 7. System 700 comprises left and right cameras 704 and 702, respectively. System 700 further comprises a depth estimator 706 which extracts a depth map 708 from the stereo images taken by cameras 702 and 704. Such an extractor is known in the art and does not need to be described here in further detail. The depth estimation is based on the disparity. A detailed description on depth estimation from disparity is presented in "Depth Estimation from Stereoscopic Image Pairs Assuming Piecewise Continuous Surfaces" by L. Falkenhagen, published in Proc. of European Workshop on combined Real and Synthetic Image Processing for Broadcast and Video Production, Hamburg, November 1994. An error measure E(m) is derived on the basis of the disparity as described with reference to FIGS. 4, 5 and 6. Error measure E(m) is minimized in minimizer 710 by calculating update values for the calibration parameters in array m 712. An example of the operation of minimizer 710 is described above with reference to FIG. 4. The updates of the calibration parameters are then used in a calibration unit 714 in order to change the coordinates of the pixels of the image from camera 702. Depth estimator 706, error minimizer 710, array m 712 and calibration unit 714 are part of calibration means 716. In one embodiment of the invention, calibration unit 714 is a software module in the data path from camera 702. The calibration is then carried out purely in software. Another embodiment uses a pan-tilt-zoom camera for at least camera 702. In this embodiment, calibration unit 714 comprises a pan-tilt-zoom unit to adjust the pan, tilt and zoom of camera 702 under the control of minimizer 710. The pan-tilt-zoom unit of calibration unit 714 then comprises e.g. a stepper motor or another transducer to effect the adjustments at camera 702.

System 700 is initialized with certain parameter values in array m upon starting the operational use of system 700.

Array m is initialized as follows. Parameters $m_0$, $m_3$ and $m_7$ are set to unity. Parameter $m_7$ is set to unity if there is no tilt. Parameters $m_1$, $m_2$, $m_4$, $m_5$ and $m_6$ are set to zero.

Figure 8:
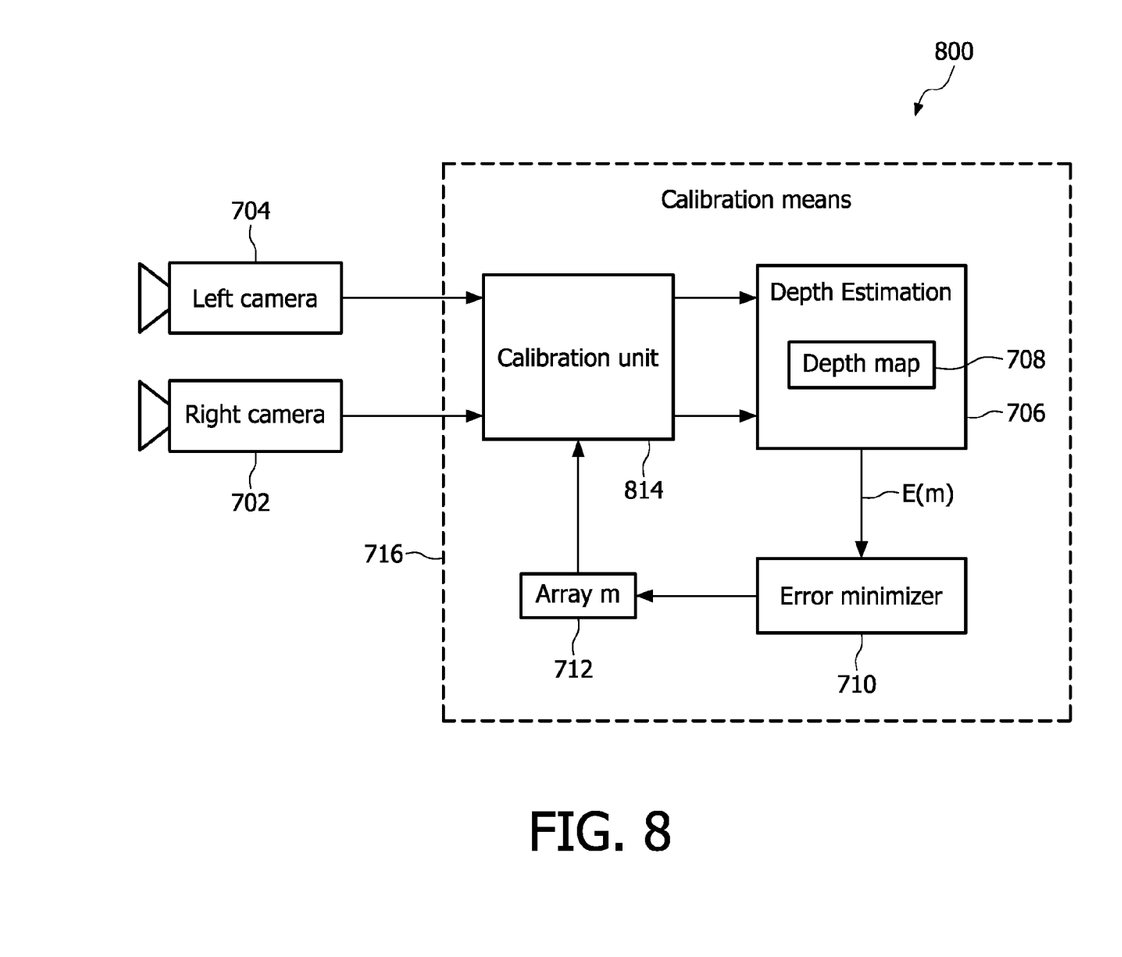
FIG. 8 is a diagram of a system in accordance with the second embodiment of the invention.

Referring to FIG. 8, the system 800 represents a camera system which is capable of recording at least two images simultaneously and comprises two cameras 702 and 704, which make up a stereo camera system, and a calibrating means 716 arranged to process a first pair of images from the respective cameras. The system 800 further comprises a calibration unit 814 arranged to transform both the first and the second image of a first pair of images obtained from the respective cameras prior to processing by the depth estimator 706.

Figure 9:
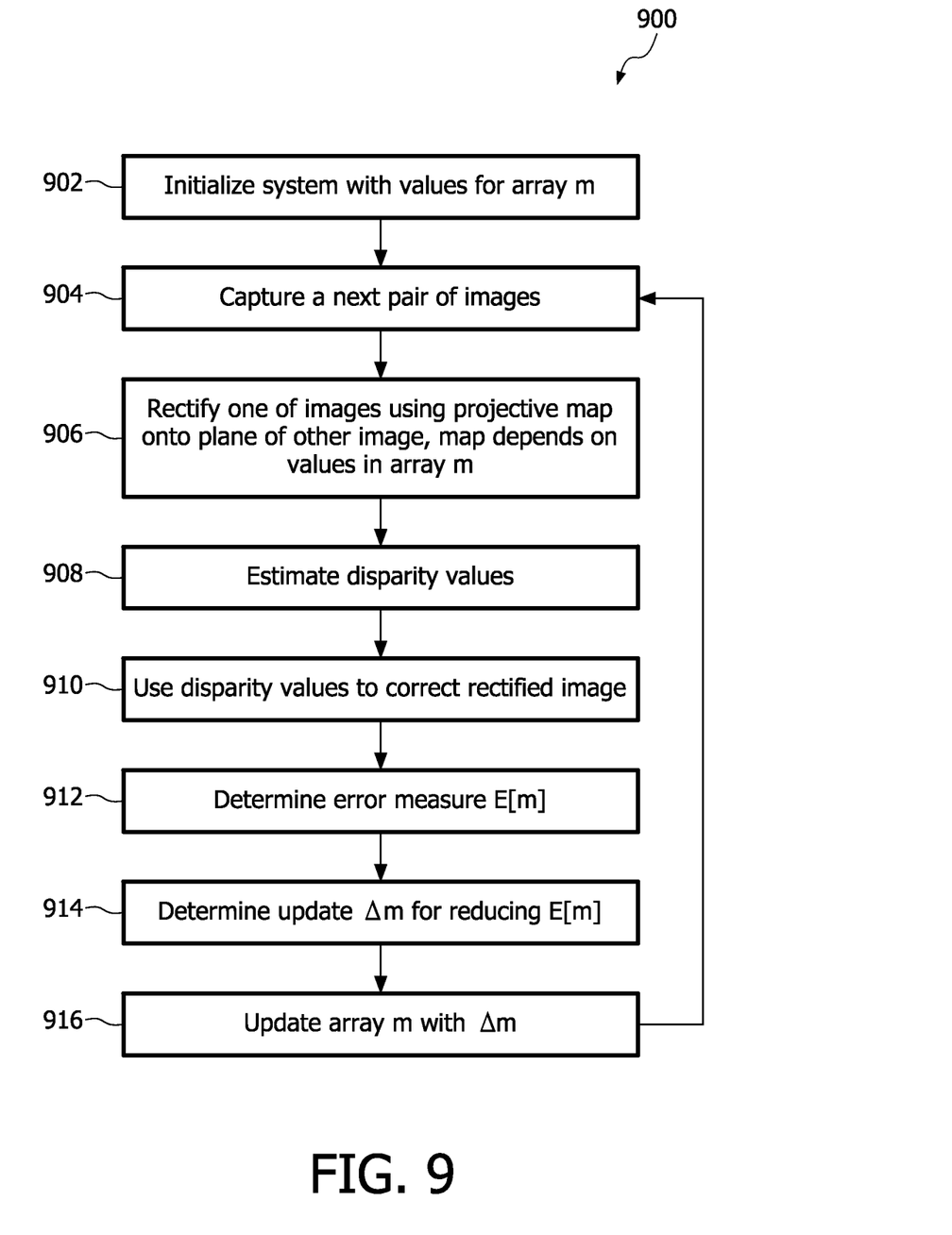
FIG. 9 is a process diagram identifying the steps of the method in the invention.

FIG. 9 is a process diagram 900 illustrating the iterative operation of system 700. In a step 902, array m of equation 402 is set with initial values. In a step 904, a pair of images (202, 206) is captured. In a step 906, a first image of the pair is transformed so as to align an epipolar line (304) in the first image with a corresponding epipolar line (306) in the second image of the pair. The transformation uses rectifying the first image through a projective map (402, 404) on a plane of the second image. The map depends on one or more parameter values currently stored in array m. In a step 908, the disparity values are determined. The disparity values used are preferably those that associate respective first pixels along the first epipolar line with respective second pixels along the second epipolar line as described with reference to FIGS. 5 and 6. In a step 910, the pixels of the transformed epipolar line, or the pixels in the window centered on the transformed epipolar line, are displaced in the transformed first image by the values of the disparity for these pixels. In a step 912, a measure of an error (412) is determined between the transformed first and second image. This error depends on the one or more parameters in array m. In a step 914, the measure is reduced, thereby determining an update for the one or more parameter values in array m. In a step 916, the updates thus determined are used to update the one or more parameter values in array m. Then, the process returns to step 904 so as to retrieve a subsequent pair of images that is going to be processed with the updated values in array m.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of calibrating a camera system which is capable of recording at least two images simultaneously, the method comprising:
   processing a first pair of images, wherein the processing step comprises:
      transforming at least one of a first and a second image of the first pair through a projective map on a plane, the map depending on one or more parameter values, so as to align an epipolar line in the first image with a corresponding epipolar line in the second image of the first pair, resulting in a second pair of images;
      estimating respective values for a disparity, which values associate respective first pixels along a first epipolar line in a first image of the second pair with respective second pixels along a corresponding second epipolar line in a second image of the second pair;
      displacing respective pixels of the first epipolar line in the first image of the second image pair in accordance with a respective value of the disparity for the respective pixels;
      determining a single measure of error as the sum of squares of individual error terms, where each individual error term comprises a difference between a first window of pixels at coordinates x,y on the first epipolar line in the first image and a second window of pixels on the second epipolar line in the second image, wherein the second window of pixels are displaced in the x-direction over the value of the estimated disparity $d(x,y)$ for the second image;
      determining an update for the one or more parameter values for reducing a value of the measure of error; and
      updating the one or more parameter values, using the update.

2. The method of claim 1, wherein the transforming step comprises rectifying a single one of the first and the second image of the first pair through a projective map on a plane of the other one of the first and the second image of the first pair.

3. The method of claim 1, wherein the transforming step comprises rectifying both the first and the second image of the first pair through an individual projective map on one and the same plane so as to horizontally align the respective epipolar lines in the images of the second pair.

4. The method of claim 1, comprising the step of subjecting a subsequent pair of images to the processing operation.

5. The method of claim 1, wherein the camera system comprises a stereo camera system.

6. Software stored on a non-transitory computer storage medium for calibrating a camera system which is capable of recording at least two images simultaneously, the software comprising instructions for processing a first pair of images, the instructions being operative to carry out the following steps:
   transforming at least one of a first and a second image of the first pair through a projective map on a plane, the map depending on one or more parameter values, so as to align an epipolar line in the first image of the first pair with a corresponding epipolar line in the second image of the first pair, resulting in a second pair of images;
   estimating respective values for a disparity, which values associate respective first pixels along the first epipolar line in a first image of the second pair with respective second pixels along a corresponding second epipolar line in a second image of the second pair;
   displacing respective pixels of the first epipolar line in the first image of the second pair in accordance with a respective value of the disparity for the respective pixels;
   determining a single measure of error as the sum of squares of individual error terms, where each individual error term comprises a difference between a first window of pixels at coordinates x,y on the first epipolar line in the first image and a second window of pixels on the second epipolar line in the second image, wherein the second window of pixels are displaced in the x-direction over the value of the estimated disparity d(x,y) for the second image;

determining an update for the one or more parameter values for reducing a value of the measure of error; and updating the one or more parameter values, using the update.

7. A non-transitory computer storage medium comprising program code means stored on a computer-readable medium for performing the method of claim 1 when said program code is executed on a computer.

8. A camera system which is capable of recording at least two images simultaneously, the camera system comprising a camera and calibrating means arranged to process a first pair of images for calibrating the camera system, wherein the calibrating means comprises:

rectifier means arranged to transform at least one of a first and a second image of the first pair so as to align an epipolar line in the first image with a corresponding epipolar line in the second image of the first pair, resulting in a second pair of images;

estimating means arranged to estimate respective values for a disparity, which values associate respective first pixels along a first epipolar line of a first image of the second pair with respective second pixels along a corresponding second epipolar line in a second image of the second pair;

displacement means arranged to displace respective pixels of the first epipolar line in the first image of the second image pair in accordance with a respective value of the disparity for the respective pixels;

error-determining means arranged to determine a single measure of error as the sum of squares of individual error terms, where each individual error term comprises a difference between a first window of pixels at coordinates x,y on the first epipolar line in the first image and a second window of pixels on the second epipolar line in the second image, wherein the second window of pixels are displaced in the x-direction over the value of the estimated disparity d(x,y) for the second image;

error-reduction means for determining an update for the one or more parameter values for reducing a value of the measure of error;

updating means for updating the one or more parameter values, using the update.

9. The system of claim 8, comprising fetching means for fetching a further pair of images to be processed by the calibration means.

10. The camera system of claim 8, comprising a stereo camera system.

11. Calibrating means for use in the camera system of claim 8.

* * * * *